United States Patent
Shu et al.

(10) Patent No.: US 12,176,831 B2
(45) Date of Patent: Dec. 24, 2024

(54) WIRELESS EXCITATION SYSTEM, DETECTION METHOD, AND ELECTRIC VEHICLE

(71) Applicant: HUAWEI TECHNOLOGIES CO., LTD., Guangdong (CN)

(72) Inventors: Weiliang Shu, Dongguan (CN); Wingto Fan, Dongguan (CN); Shuangquan Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 111 days.

(21) Appl. No.: 18/158,038

(22) Filed: Jan. 23, 2023

(65) Prior Publication Data

US 2023/0163705 A1    May 25, 2023

Related U.S. Application Data (63) Continuation of application No. PCT/CN2021/109959, filed on Aug. 2, 2021.

(30) Foreign Application Priority Data

Jul. 31, 2020 (CN) .......................... 202010760367.9

(51) Int. Cl.
  *H02P 21/14* (2016.01)
  *H02P 9/14* (2006.01)
  *H02P 25/03* (2016.01)
  *H02P 29/024* (2016.01)

(52) U.S. Cl.
  CPC ................ *H02P 21/14* (2013.01); *H02P 9/14* (2013.01); *H02P 25/03* (2016.02); *H02P 29/024* (2013.01)

(58) Field of Classification Search
  CPC .. H02P 21/14; H02P 9/14; H02P 25/03; H02P 29/024
  USPC .............................. 318/400.21, 400.01, 700
  See application file for complete search history.

(56) References Cited

U.S. PATENT DOCUMENTS 7,116,073 B1 * 10/2006 Sorkin .................... H02P 25/02
                                                    318/431

* cited by examiner

*Primary Examiner* — David Luo
(74) *Attorney, Agent, or Firm* — WOMBLE BOND DICKINSON (US) LLP (57) ABSTRACT

An input end of a first power conversion circuit of the system is connected to a power supply, and an output end of the first power conversion circuit is connected to a stator winding of an electrical excitation motor. An input end of a second power conversion circuit is connected to the power supply, and an output end of the second power conversion circuit is connected to a primary side of an excitation transformer. The excitation transformer transmits energy required by an excitation winding of the electrical excitation motor from a stator to a rotor. A first controller controls the first power conversion circuit to inject a current excitation into the stator winding, so that a current is generated on the excitation winding. A detection circuit obtains a response signal of the primary side of the excitation transformer and sends the response signal to a second controller.

20 Claims, 7 Drawing Sheets

WIRELESS EXCITATION SYSTEM, DETECTION METHOD, AND ELECTRIC VEHICLE

CROSS-REFERENCE TO RELATED APPLICATIONS

This application is a continuation of International Application No. PCT/CN2021/109959, filed on Aug. 2, 2021, which claims priority to Chinese Patent Application No. 202010760367.9, filed on Jul. 31, 2020. The disclosures of the aforementioned applications are hereby incorporated by reference in their entireties.

TECHNICAL FIELD

This application relates to the field of electronic and electric technologies, and in particular, to a wireless excitation system, a detection method, and an electric vehicle.

BACKGROUND

When a drive motor of an electric vehicle is a permanent magnet synchronous motor, a high-voltage counter electromotive force is generated on a motor stator winding when the motor runs at a high rotational speed. In this case, if the rotational speed of the motor is further increased, a first controller may be damaged. Because a magnetic field generated by a permanent magnet material of a motor rotor cannot be adjusted, only a d-axis (consistent with a magnetic field direction of the motor rotor) current on a motor stator side can be adjusted to change an air gap magnetic field, thereby reducing the counter electromotive force of the motor stator winding. However, when the d-axis current is increased, efficiency of the motor running at a high rotational speed is significantly reduced.

Today, to improve efficiency of a motor running at a high rotational speed, a wireless excitation synchronous motor (referred to as an electrical excitation motor for short below) may be used. The wireless excitation means that power is supplied to an excitation winding of a motor rotor in a wireless manner by using an excitation transformer. A magnetic field of a controllable magnitude is generated on the motor rotor to replace a constant magnetic field of a permanent magnet material of the motor rotor, so that a magnitude of the magnetic field of the motor rotor can be controlled.

However, an actual electrical parameter may change due to a parameter deviation and an installation error of the excitation transformer. After the electrical excitation motor and the excitation transformer are assembled, it is difficult to test the electrical parameter again, making it inconvenient to determine a fault.

SUMMARY

To resolve the foregoing technical problem in conventional technologies, this application provides a wireless excitation system, a detection method, and an electric vehicle, to detect an electrical parameter of the wireless excitation system.

According to a first aspect, this application provides a wireless excitation system, including: an excitation transformer, an excitation rectifier circuit, an electrical excitation motor, a detection circuit, a first power conversion circuit, a second power conversion circuit, a first controller, and a second controller. An input end of the first power conversion circuit is connected to a power supply, and an output end of the first power conversion circuit is connected to a stator winding of the electrical excitation motor. An input end of the second power conversion circuit is connected to the power supply, and an output end of the second power conversion circuit is connected to a primary side of the excitation transformer. The excitation transformer is configured to transmit energy required by an excitation winding of the electrical excitation motor from a stator to a rotor. The excitation rectifier circuit is configured to convert an alternating current (AC) received by a secondary side of the excitation transformer into a direct current (DC) and then transmit the direct current to the excitation winding. The first controller is configured to control the first power conversion circuit to inject a current excitation into the stator winding so that a current is generated on the excitation winding. The detection circuit is configured to obtain a response signal of the primary side of the excitation transformer and send the response signal to the second controller. When the current generated on the excitation winding causes the secondary side of the excitation transformer to be short-circuited, and when the current generated on the excitation winding causes the secondary side of the excitation transformer to be open-circuited, the second controller controls the second power conversion circuit to inject a pulse current excitation into the primary side of the excitation transformer, and determines an electrical parameter of the excitation transformer by using a response signal.

In the system, different current excitations are injected into the stator winding of the electrical excitation motor, so that currents are generated on the excitation winding. A current direction of the excitation winding affects a load characteristic of a rectifier bridge on the motor rotor side, so that the secondary side of the excitation transformer can present two different load states: short-circuited and open-circuited. The second controller detects the response signal, corresponding to the pulse current excitation, of the primary side of the excitation transformer by using the detection circuit, and determines the electrical parameter of the excitation transformer based on the response signal.

In an embodiment, the electrical parameter includes a leakage inductance and an inductance of an excitation inductor, and the second controller obtains a leakage inductance of the primary side of the excitation transformer and a leakage inductance of the secondary side of the excitation transformer by using a resonance frequency of a response signal obtained when the secondary side of the excitation transformer is short-circuited; and obtains an inductance of an excitation inductor of the excitation transformer by using a resonance frequency of a response signal obtained when the secondary side of the excitation transformer is open-circuited.

That is, the second controller may obtain the leakage inductance of the primary side, the leakage inductance of the secondary side, and the inductance of the excitation inductor of the excitation transformer based on different response signals of the primary side that are obtained when the secondary side is in two different load states: short-circuited and open-circuited. In some embodiments, the leakage inductance of the primary side of the excitation transformer is generally greater than or equal to the leakage inductance of the secondary side.

In an embodiment, the second controller is further configured to: when an absolute value of a difference between the electrical parameter and a preset electrical parameter is greater than a preset threshold, determine that the wireless excitation system is faulty.

That is, the second controller of the system may determine, by using the electrical parameter, whether the wireless excitation system is faulty.

In an embodiment, the second controller is further configured to perform fault detection on the wireless excitation system by using the response signal.

In the system of this application, because the obtained response signals are responses of the primary side to the pulse current excitation when the secondary side of the excitation transformer has different load characteristics, whether the wireless excitation system is faulty may be detected by using the response signals.

In an embodiment, the second controller is configured to: determine that a diode of the excitation rectifier circuit has an open circuit fault when a frequency of the response signal is lower than a preset frequency range; determine that the diode of the excitation rectifier circuit has a short circuit fault when the frequency of the response signal is higher than the preset frequency range; and determine that a capacitance of an output capacitor of the excitation rectifier circuit is abnormal when an amplitude of the response signal is higher than a preset amplitude range.

In an embodiment, the first controller controls, within a first preset time, the first power conversion circuit to inject a gradually decreasing d-axis current excitation into the stator winding of the electrical excitation motor, so that the secondary side of the excitation transformer is short-circuited, where the d-axis is consistent with a magnetic field direction of the rotor; and controls, within a second preset time, the first power conversion circuit to inject a gradually increasing d-axis current excitation into the stator winding of the electrical excitation motor, so that the secondary side of the excitation transformer is short-circuited.

The first preset time is greater than a duration of the pulse current excitation, to ensure that the secondary side of the excitation transformer is in the short-circuited state within the duration of the pulse current excitation. The second preset time is greater than the duration of the pulse current excitation, to ensure that the secondary side of the excitation transformer is in the open-circuited state within the duration of the pulse current excitation.

In an embodiment, the first controller is further configured to send a control instruction to the second controller after injecting the current excitation into the stator winding of the electrical excitation motor, where the control instruction is used to instruct the second controller to control the second power conversion circuit to inject the pulse current excitation into the primary side of the excitation transformer. That is, the first controller instructs the second controller to start detecting the electrical parameter.

In an embodiment, the detection circuit includes a current transformer and a signal processing circuit. A primary side winding of the current transformer is connected to the primary side of the excitation transformer, and a secondary side winding of the current transformer is connected to the signal processing circuit. The signal processing circuit is configured to process a signal collected by the current transformer to obtain the response signal, and send the response signal to the second controller.

In an embodiment, the first controller and the second controller are integrated into one micro control unit MCU.

In some other embodiments, alternatively, the first controller and the second controller may be separately integrated into different micro control units.

According to a second aspect, this application further provides a detection method for a wireless excitation system, applied to the wireless excitation system provided in the foregoing embodiments. The method includes:
controlling the first power conversion circuit to inject a current excitation into the stator winding of the electrical excitation motor, so that a current is generated on the excitation winding; and
when the current generated on the excitation winding causes the secondary side of the excitation transformer to be short-circuited, and when the current generated on the excitation winding causes the secondary side of the excitation transformer to be open-circuited, controlling the second power conversion circuit to inject a pulse current excitation into the primary side of the excitation transformer, and determining an electrical parameter of the excitation transformer by using a response signal of the primary side of the excitation transformer.

In an embodiment, the electrical parameter includes a leakage inductance and an inductance of an excitation inductor, and the determining an electrical parameter of the excitation transformer by using a response signal of the primary side of the excitation transformer includes:
obtaining a leakage inductance of the primary side of the excitation transformer and a leakage inductance of the secondary side of the excitation transformer by using a resonance frequency of a response signal obtained when the secondary side of the excitation transformer is short-circuited; and
obtaining an inductance of an excitation inductor of the excitation transformer by using a resonance frequency of a response signal obtained when the secondary side of the excitation transformer is open-circuited.

In an embodiment, the method further includes: when an absolute value of a difference between the electrical parameter and a preset electrical parameter is greater than a preset threshold, determining that the wireless excitation system is faulty.

In an embodiment, the method further includes: performing fault detection on the wireless excitation system by using the response signal.

In an embodiment, the performing fault detection on the wireless excitation system by using the response signal includes:
determining that a diode of the excitation rectifier circuit has an open circuit fault when a frequency of the response signal is lower than a preset frequency range; determining that the diode of the excitation rectifier circuit has a short circuit fault when the frequency of the response signal is higher than the preset frequency range; and determining that a capacitance of an output capacitor of the excitation rectifier circuit is abnormal when an amplitude of the response signal is higher than a preset amplitude range.

In an embodiment, the controlling the first power conversion circuit to inject a current excitation into the stator winding of the motor, so that a current is generated on the excitation winding includes:
controlling, within a first preset time, the first power conversion circuit to inject a gradually decreasing d-axis current excitation into the stator winding of the electrical excitation motor, so that a current is generated on the excitation winding, and the secondary side of the excitation transformer is short-circuited, where the d-axis is consistent with a magnetic field direction of the rotor; and
controlling, within a second preset time, the first power conversion circuit to inject a gradually increasing d-axis current excitation into the stator winding of the electrical excitation motor, so that a current is generated on the excitation winding, and the secondary side of the excitation transformer is short-circuited.

The first preset time and the second preset time are greater than a duration of the pulse current excitation.

According to a third aspect, this application further provides an electric vehicle. The electric vehicle includes the wireless excitation system provided in any one of the foregoing embodiments, and further includes a power battery pack. The power battery pack is configured to supply power to the wireless excitation system.

The technical solutions provided in this application have at least the following advantages:

In the wireless excitation system provided in this application, the first controller controls the first power conversion circuit to inject a current excitation into the stator winding of the electrical excitation motor, so that a current is generated on the excitation winding, thereby changing a load characteristic of the secondary side of the excitation transformer. When the current generated on the excitation winding causes the secondary side of the excitation transformer to be short-circuited, the second controller controls the second power conversion circuit to inject a pulse current excitation into the primary side of the excitation transformer, and when the current generated on the excitation winding causes the secondary side of the excitation transformer to be open-circuited, the second controller controls the second power conversion circuit to inject a pulse current excitation into the primary side of the excitation transformer. The pulse current excitation causes the primary side of the excitation transformer to generate a response signal corresponding to the pulse current excitation. The detection circuit obtains the response signal of the primary side of the excitation transformer, and then transmits the response signal to the second controller. For different load characteristics of the secondary side of the excitation transformer, different response signals are obtained. Therefore, the second controller may determine the electrical parameter of the excitation transformer based on the received response signal, to determine a fault.

DESCRIPTION OF EMBODIMENTS

To make solutions of this application more clearly understood by persons skilled in the art, an operating principle of a wireless excitation system is first described below.

Figure 1:
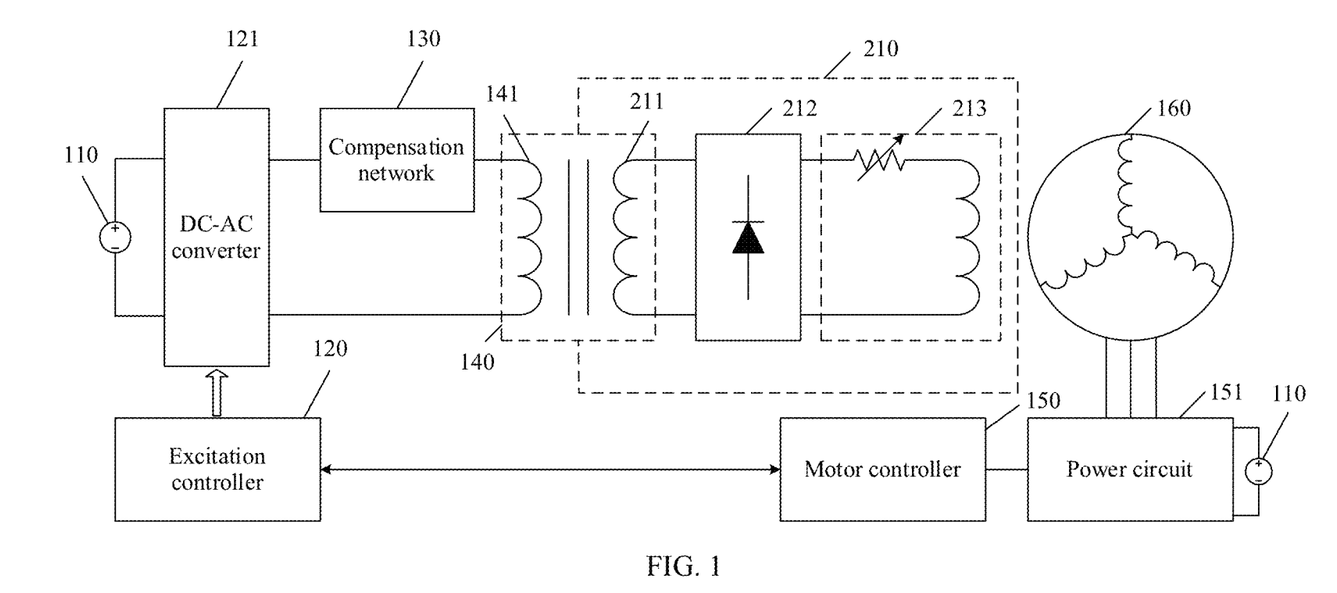
FIG. 1 is a schematic diagram of a wireless excitation system.

FIG. 1 is a schematic diagram of a wireless excitation system.

The wireless excitation system includes a direct current power supply 110, an excitation controller 120, a DC-AC converter 121, a compensation circuit 130, an excitation transformer 140, a motor controller 150, a power circuit 151, a winding 160 of a motor stator, a motor rotor 210, and the like.

The direct current power supply 110 supplies a direct current to the excitation controller 120 and the motor controller 150. In some embodiments, the direct current power supply 110 may be an on-board power battery pack.

Under control of the excitation controller 120, the DC-AC converter 121 converts direct current obtained from the direct current power supply 110 into an alternating current, and then supplies the alternating current to the excitation transformer 140.

The compensation network 130 mainly includes an inductor and a capacitor for matching an impedance relationship required by a power conversion circuit. In some embodiments, the compensation network 130 may not be used.

The excitation transformer 140 includes an excitation transformer primary side 141 and an excitation transformer secondary side 211. The excitation transformer primary side 141 is stationary relative to the motor stator in an electrical excitation motor, and the excitation transformer secondary side 211 rotates together with the motor rotor 210 at a high speed. Excitation energy required by the motor rotor 210 is supplied from the motor stator side to the motor rotor side by the excitation transformer 140.

The motor controller 150 is configured to control the power circuit 151 to generate an alternating current at a controllable frequency and amplitude and supply the alternating current to the stator winding 160 of the motor.

The motor controller 150 and the excitation controller 120 may be integrated, for example, integrated on a same MCU (micro control unit), or may be separately disposed on different MCUs. When disposed independently of each other, the two exchange signals, and the motor controller 150 sends its excitation current demand to the excitation controller 120.

The stator winding 160 of the motor is injected with the alternating current at a controllable frequency and amplitude by using the motor controller 150 to generate a rotating magnetic field. The rotating magnetic field drives the motor rotor 210 to rotate synchronously.

The motor rotor 210 includes at least the excitation transformer secondary side 211, an excitation rectifier circuit 212, and an excitation winding 213. The excitation transformer secondary side 211 is configured to receive energy transmitted by the excitation transformer primary side 141, the excitation rectifier circuit 212 converts an alternating current received by the excitation transformer secondary side 211 into a direct current, and the direct current flowing through the excitation winding 213 generates a direct current magnetic field.

Because the excitation transformer 140 is a rotary transformer, a specific parameter deviation and installation error exist, so that an actual electrical parameter may change. After the electrical excitation motor and the excitation transformer 140 are assembled, it is difficult to detect the electrical parameter again by using a conventional method, making it inconvenient to determine a fault.

At present, an auxiliary power supply, a detection circuit, and a communication circuit may be disposed on the motor rotor 210 side, and information such as a voltage and a current on the motor rotor side may be transmitted to the stator side of the motor in a wireless communication manner, to detect an excitation current.

However, on one hand, the foregoing technical solution is relatively complex during implementation and has relatively high costs. On the other hand, a circuit needs to be disposed on the motor rotor side in a high-speed rotation and high-temperature environment, resulting in relatively low reliability of the circuit.

To resolve the foregoing problems, embodiments of this application provide a wireless excitation system, a detection method, and an electric vehicle. Different current excitations are injected into a stator winding of an electrical excitation motor, so that currents are generated on an excitation winding. A current direction of the excitation winding affects a load characteristic of a rectifier bridge on a motor rotor side, so that a secondary side of an excitation transformer can present two different load states: short-circuited and open-circuited. When the secondary side of the excitation transformer is short-circuited, and when the secondary side of the excitation transformer is open-circuited, a pulse current excitation is injected into a primary side of the excitation transformer. A response signal, corresponding to the pulse current excitation, of the primary side of the excitation transformer is detected by using a detection circuit, and an electrical parameter of the excitation transformer is determined based on the response signal.

In conclusion, the system can accurately detect the electrical parameter of the wireless excitation system, and because only an electrical signal of the primary side of the excitation transformer needs to be detected, it is unnecessary to add a complex auxiliary power supply, communication circuit, and the like on the motor rotor side, thereby reducing costs and improving reliability.

To make persons skilled in the art understand the technical solutions in this application better, the following describes the technical solutions in embodiments of this application with reference to the accompanying drawings in embodiments of this application.

The terms such as "first", "second", and "third" in the description of this application are merely used for a description purpose, and cannot be interpreted as indicating or implying relative importance or implying a quantity of indicated technical features.

In this application, unless otherwise expressly specified and limited, the term "connected" should be understood in a broad sense. For example, "connected" may be a fixed connection, or may be a detachable connection or be integrated, which may be directly connected or indirectly connected by using an intermediate medium.

Embodiment 1

This embodiment of this application provides a wireless excitation system, which is described below with reference to an accompanying drawing.

Figure 2:
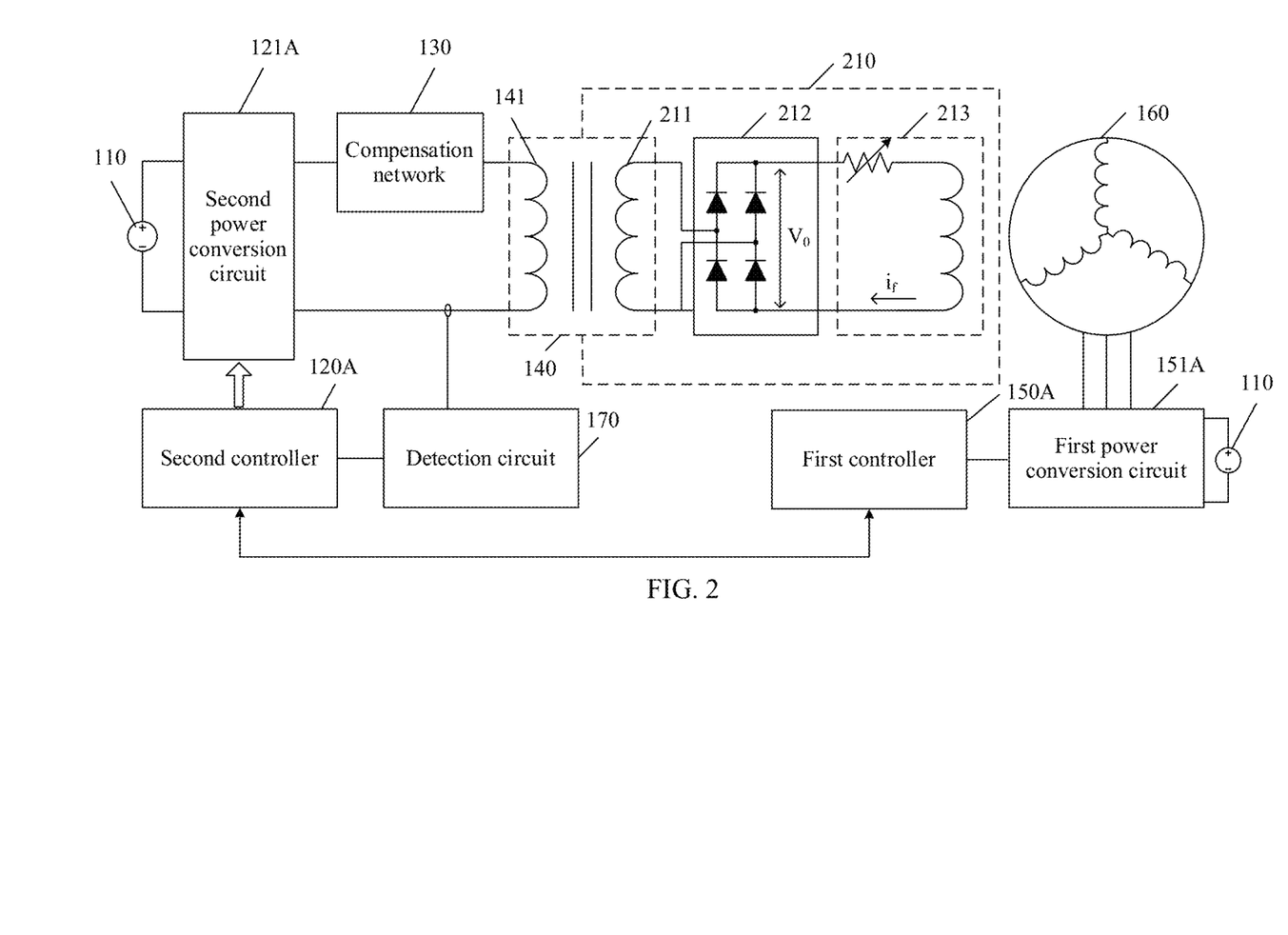
FIG. 2 is a schematic diagram of a wireless excitation system according to an embodiment of this application.

FIG. 2 is a schematic diagram of a wireless excitation system according to an embodiment of this application.

The wireless excitation system provided in this embodiment of this application includes: a second controller 120A, an excitation transformer 140, an excitation rectifier circuit 212, an electrical excitation motor, a second power conversion circuit 121A, a first power conversion circuit 151A, a first controller 150A, and a detection circuit 170.

The electrical excitation motor includes a motor stator and a motor rotor 210. The motor stator is a stationary part of the motor, and mainly includes an iron core (not shown in the figure), a stator winding 160, and a base (not shown in the figure). The motor rotor is a rotating part in the motor, configured to convert electric energy into mechanical energy, and includes at least an excitation transformer secondary side 211, an excitation rectifier circuit 212, and an excitation winding 213. In this embodiment of this application, an example in which the excitation rectifier circuit 212 is a full-bridge rectifier circuit is used for description. Each half-bridge arm of the full-bridge rectifier circuit includes one diode.

In an embodiment of this application, a primary side of the excitation transformer 140 is stationary relative to the stator of the electrical excitation motor, and the secondary side of the excitation transformer 140 is stationary relative to the rotor of the electrical excitation motor. The excitation transformer 140 is configured to transmit energy required by the excitation winding of the electrical excitation motor from the motor stator to the motor rotor.

An input end of the second power conversion circuit 121A is connected to a power supply 110, and an output end of the second power conversion circuit 121A is connected to the primary side of the excitation transformer. In some embodiments, the second power conversion circuit 121A is configured to convert a direct current into an alternating current, that is, may be the DC-AC converter 121 in FIG. 1.

An input end of the first power conversion circuit 151A is connected to the power supply 110, and an output end of the first power conversion circuit 151A is connected to the stator winding 160 of the electrical excitation motor. In some embodiments, the first power conversion circuit 151A is configured to convert a direct current into an alternating current, that is, may be the power circuit 151 in FIG. 1. The first controller 150A is configured to control the first power conversion circuit 151A to inject a current excitation into the stator winding of the motor, so that a current is generated on the excitation winding 213. Details are described below. For ease of description, in the following description of this application, a current direction along the circuit is forward clockwise, and negative counterclockwise.

Still with reference to FIG. 2, when the first controller 150A controls the first power conversion circuit 151A to inject a gradually decreasing current excitation into the stator winding of the motor and then keep the current excitation unchanged, the excitation winding 213 generates a forward current $i_f$. The forward current returns through a diode of the excitation rectifier circuit 212. Therefore, $V_o=0$, and a rectifier bridge is short-circuited for a short time. When the first controller 150A controls the first power conversion circuit 151A to inject a uniformly increasing excitation current into the stator winding of the motor, the excitation winding 213 generates a negative current (opposite to a direction of $i_f$ shown in the figure). Due to the negative current, load of the excitation winding is unrelated to an output of the excitation rectifier circuit 212, so that the excitation rectifier circuit 212 is open-circuited for a short time.

That is, the currents generated on the excitation winding cause the secondary side of the excitation transformer to appear in two states: short-circuited and open-circuited, that is, change a load characteristic of the secondary side of the excitation transformer.

When the current generated on the excitation winding 213 causes the secondary side 211 of the excitation transformer to be short-circuited, and when the current generated on the excitation winding 213 causes the secondary side 211 of the excitation transformer to be open-circuited, the second controller 120A controls the second power conversion circuit 121A to inject a pulse current excitation into the primary side of the excitation transformer.

The detection circuit 170 is configured to obtain a response signal of the primary side of the excitation transformer and transmit the response signal to the second controller 120A. For different load characteristics of the secondary side of the excitation transformer, the primary side of the excitation transformer generates different response signals.

The second controller 120A may determine an electrical parameter of the excitation transformer based on the detected response signal and a component parameter known in the circuit, for example, may determine a leakage inductance and an excitation inductance of the excitation transformer. That is, the electrical parameter of the excitation transformer is detected.

In conclusion, in the wireless excitation system provided in an embodiment of this application, the first controller controls the first power conversion circuit to inject a current excitation into the stator winding of the motor, so that a current is generated on the excitation winding, thereby changing a load characteristic of the secondary side of the excitation transformer. When the current generated on the excitation winding causes the secondary side of the excitation transformer to be short-circuited, and when the current generated on the excitation winding causes the secondary side of the excitation transformer to be open-circuited, the second controller controls the second power conversion circuit to inject a pulse current excitation into the primary side of the excitation transformer. The pulse current excitation causes the primary side of the excitation transformer to generate a response signal corresponding to the pulse current excitation. The detection circuit obtains the response signal of the primary side of the excitation transformer, and then transmits the response signal to the second controller. For different load characteristics of the secondary side of the excitation transformer, different response signals are obtained. Therefore, the second controller may determine the electrical parameter of the excitation transformer based on the received response signal.

Compared with a solution in which an auxiliary power supply, a detection circuit, and a communication circuit are disposed on the motor rotor side to detect the electrical parameter, the wireless excitation system provided in this embodiment of this application has lower hardware costs, and detection may be completed on the stator side of the electrical excitation motor without adding a hardware circuit on the rotor side of the electrical excitation motor, thereby improving reliability.

Embodiment 2

To make persons skilled in the art better understand the technical solutions of this application, the following describes a detection principle of the wireless excitation system.

Figure 3:
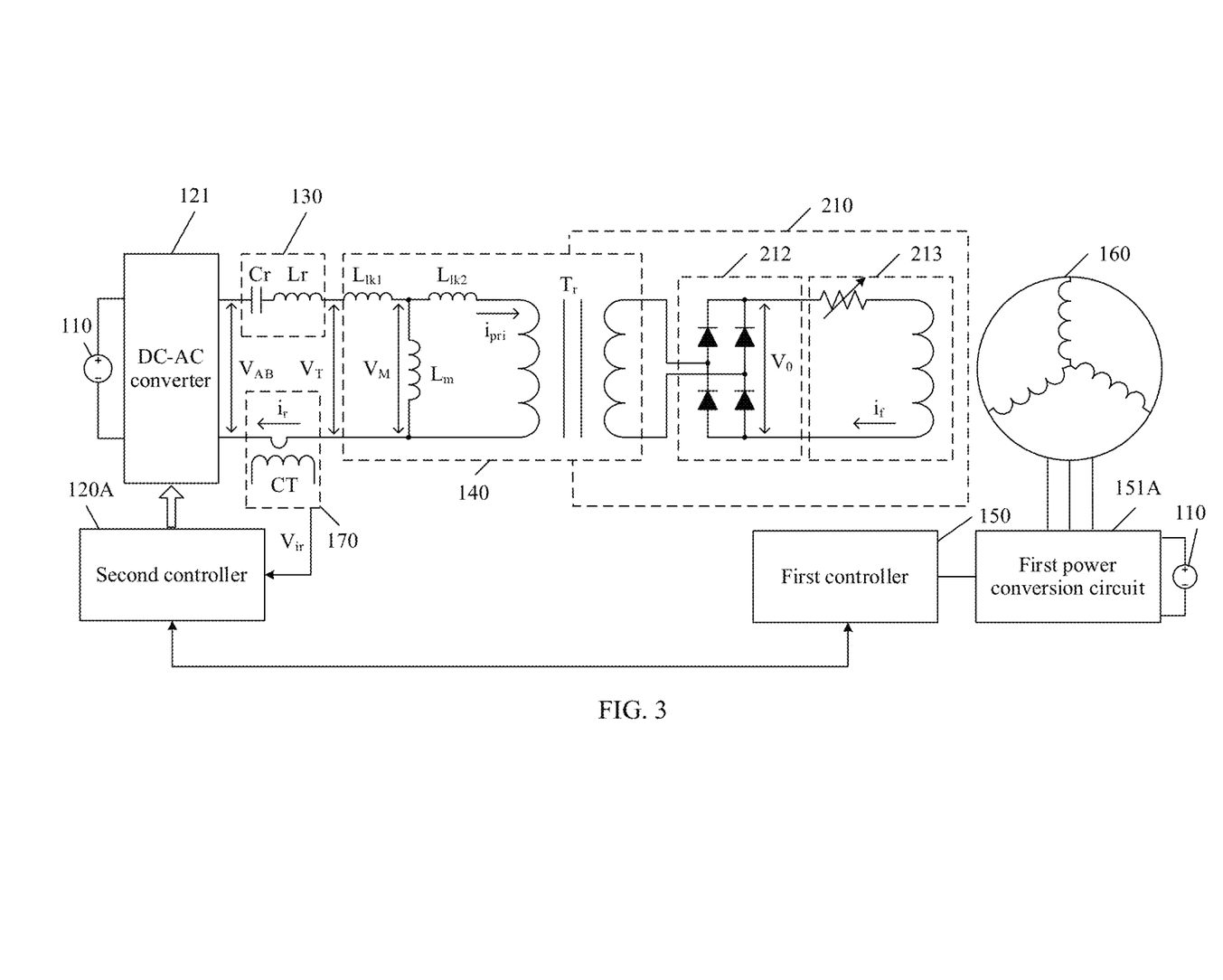
FIG. 3 is a schematic diagram of another wireless excitation system according to an embodiment of this application.

FIG. 3 is a schematic diagram of another wireless excitation system according to an embodiment of this application.

A compensation network 130 includes an inductor Lr and a capacitor Cr. An inductance of the inductor Lr and a capacitance of the capacitor Cr are known parameters during system design. An example in which the second power conversion circuit 121A is the DC-AC converter 121 is used for description.

In FIG. 3, equivalent processing is performed on the excitation transformer 140, whose equivalent model includes: a leakage inductor $L_{lk1}$ on the primary side, a leakage inductor $L_{lk2}$ on the secondary side, an excitation inductor $L_m$, and an ideal transformer $T_r$.

In this embodiment of this application, an example in which the detection circuit 170 used includes a current transformer CT and a signal processing circuit is used for description. The current transformer CT is configured to detect a current response $i_r$ of the primary side of the excitation transformer, and an obtained electrical signal is $V_{ir}$. The signal processing circuit is configured to process the signal collected by the current transformer to obtain a response signal, and send the response signal to the second controller.

For ease of description, in the following description, a current direction along the circuit is still forward clockwise, and negative counterclockwise.

Figure 4:
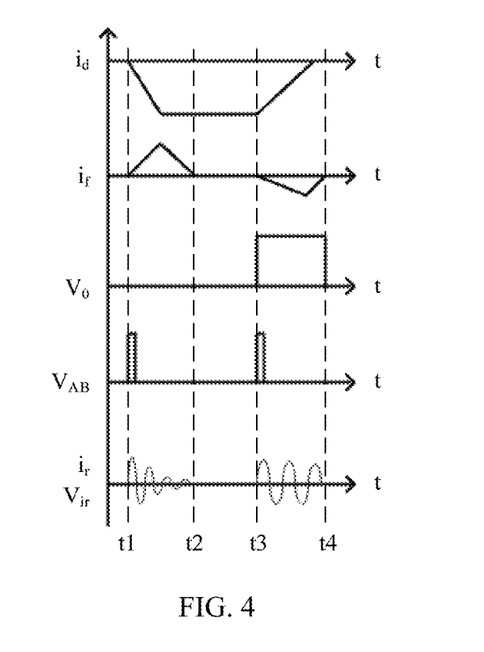
FIG. 4 is a schematic diagram of a signal time sequence according to an embodiment of this application.

FIG. 4 is a schematic diagram of a signal time sequence according to an embodiment of this application.

$i_d$ represents a d-axis current excitation that the first controller 150A controls the first power conversion circuit 151A to inject into the stator winding 160 of the motor. The d-axis is consistent with a magnetic field direction of the rotor. When $i_d$ gradually decreases with time, in some embodiments, $$\frac{di_d}{dt}$$

may be a negative value and remain unchanged, and $i_d$ is injected into the stator winding 160 and then remains unchanged, so that the excitation winding 213 generates a forward current $i_f$, corresponding to a time period (first preset time) of t1 to t2 in FIG. 4. In this case, the forward current if returns through the diode of the excitation rectifier circuit 212, and the diode of the excitation rectifier circuit 212 is turned on forward. Therefore, V0=0, and the excitation rectifier circuit 212 is in the short-circuited state during this period of time.

When a secondary side of the ideal transformer Tr (that is, the secondary side of the excitation transformer 140) is short-circuited, the ideal transformer Tr is equivalent to that the leakage inductor $L_{lk2}$ of the secondary side is first connected in parallel to the excitation inductor $L_m$, and then connected in series to the leakage inductor $L_{lk1}$ of the primary side. In addition, because an inductance of the excitation inductor $L_m$ is much greater than an inductance of the secondary side $L_{lk2}$, an inductance after the two are connected in parallel is about the inductance of the inductor $L_{lk2}$ of the secondary side. Therefore, an inductor connected to the excitation transformer 140 is equivalent to $(L_{lk1}+L_{lk2})$, and in this case, a resonance frequency $f_1$ of a primary side of the ideal transformer Tr is:

$$f_1 = \frac{1}{2\pi\sqrt{C_r(L_r + L_{lk_1} + L_{lk_2})}} \quad (1)$$

When the secondary side of the ideal transformer Tr is short-circuited, the second controller 120A injects a pulse current excitation into the primary side of the ideal transformer Tr. In some embodiments, the second controller 120A injects the pulse current excitation into the primary side of the ideal transformer Tr by controlling an operating state of the DC-AC converter 121. The pulse current excitation generates a corresponding voltage $V_{AB}$ at the output end of the DC-AC converter 121. A duration of the pulse current excitation is shorter than a short-circuited time of the secondary side of the ideal transformer Tr. The duration of the pulse current excitation is not limited in this embodiment of this application.

For example, the duration may be 5 µs, and the time period of t1 to t2 may be longer, for example, 20 times the duration of the pulse current excitation, to ensure that the secondary side of the ideal transformer Tr is in the short-circuited state within the duration of the pulse current excitation.

In some embodiments, after the first controller 150A injects the current excitation into the stator winding 160 of the motor, the first controller 150A may send a detection instruction to the second controller 120A to instruct the second controller 120A to inject a pulse current excitation into the primary side of the ideal transformer Tr.

The pulse current excitation causes natural resonance on the capacitor Cr and an inductor $(L_r+L_{lk1}+L_{lk2})$ of the ideal transformer Tr, and the primary side of the ideal transformer Tr generates a response signal $i_r$ corresponding to the pulse current excitation. A waveform of the response signal $i_r$ is presented as a damped oscillating waveform.

A high-frequency alternating current response signal $i_r$ flows in a primary side winding of the ideal transformer Tr. After the response signal passes through the detection circuit 170, a signal $V_{ir}$ reflecting a current magnitude and phase of the response signal $i_r$ can be obtained and sent to the second controller 120A.

The second controller 120A obtains a frequency of the signal $V_{ir}$, that is, the resonance frequency $f_1$. Because the inductance of the inductor Lr and the capacitance of the capacitor Cr are known parameters, and the leakage inductor $L_{lk1}$ of the primary side and the leakage inductor $L_{lk2}$ of the secondary side in the transformer model are the same, the leakage inductor $L_{lk1}$ of the primary side and the leakage inductor $L_{lk2}$ of the secondary side may be determined based on the formula (1).

Then, the first controller 150A controls the first power conversion circuit 151A to change the d-axis current excitation $i_d$ injected into the stator winding of the electrical excitation motor, so that $i_d$ gradually increases with time. In some embodiments, $$\frac{di_d}{dt}$$

may be a positive value and remain unchanged, corresponding to a time period (second preset time) of t3 to t4 in FIG. 4. In this case, the excitation winding 213 generates a negative current if (opposite to the direction of $i_f$ shown in FIG. 3), the diode of the excitation rectifier circuit 212 is cut off reversely, and the excitation rectifier circuit 212 is in the open-circuited state during this period of time.

When the secondary side of the ideal transformer Tr (that is, the secondary side of the excitation transformer 140) is open-circuited, the ideal transformer Tr is equivalent to that the leakage inductor $L_{lk1}$ of the primary side is connected in series to the excitation inductor $L_m$. Therefore, the inductor connected to the excitation transformer 140 is equivalent to $(L_{lk1}+L_m)$, and in this case, the resonance frequency $f_2$ of the primary side of the ideal transformer Tr is:

$$f_2 = \frac{1}{2\pi\sqrt{C_r(L_r+L_{lk1}+L_m)}} \quad (2)$$

When the secondary side of the ideal transformer Tr is open-circuited, the second controller 120A injects a pulse current excitation into the primary side of the ideal transformer Tr. In some embodiments, the second controller 120A injects the pulse current excitation into the primary side of the ideal transformer Tr by controlling an operating state of the DC-AC converter 121. The pulse current excitation generates a corresponding voltage $V_{AB}$ at the output end of the DC-AC converter 121. A duration of the pulse current excitation is shorter than an open-circuited time of the secondary side of the ideal transformer Tr. The duration of the pulse current excitation is not limited in this embodiment of this application.

For example, the duration may be 5 µs, and the time period of t3 to t4 may be longer, for example, 20 times the duration of the pulse current excitation, to ensure that the secondary side of the ideal transformer Tr is in the open-circuited state within the duration of the pulse current excitation.

The pulse current excitation injected by the second controller 120A when the secondary side of the ideal transformer Tr is open-circuited may be the same as or different from the pulse current excitation injected when the secondary side of the ideal transformer Tr is short-circuited. This is not limited in this embodiment of this application.

The pulse current excitation causes natural resonance on the capacitor Cr and an inductor $(L_r+L_{lk1}+L_m)$ of the ideal transformer Tr, and the primary side of the ideal transformer Tr generates a response signal $i_r$ corresponding to the pulse current excitation.

A high-frequency alternating current response signal $i_r$ flows in a primary side winding of the ideal transformer Tr. After the response signal passes through the detection circuit, a signal $V_{ir}$ reflecting a current magnitude and phase of the response signal $i_r$ can be obtained and sent to the second controller 120A.

The second controller 120A obtains a frequency of the signal $V_{ir}$, that is, the resonance frequency $f_2$. Because the inductance of the inductor Lr and the capacitance of the capacitor Cr are known parameters, and the leakage inductor $L_{lk1}$ of the primary side (as well as the leakage inductor $L_{lk2}$) of the secondary side is determined based on the formula (1), the excitation inductor $L_m$ may be further determined based on the formula (2).

In some embodiments, the second controller 120A may perform AD sampling on the obtained signal $V_{ir}$ to obtain a digital signal, and then perform numerical analysis processing. The second controller 120A may include an MCU, and perform AD sampling and numerical analysis processing on the signal $V_{ir}$ by using the MCU. The second controller 120A may further include an ADC (analog to digital converter). The ADC performs AD sampling on the signal $V_{ir}$, and transmits an obtained digital signal to the MCU for numerical analysis processing.

In some other embodiments, alternatively, the second controller 120A may first perform analog signal processing on the signal $V_{ir}$, that is, sample an envelope signal of the signal $V_{ir}$ to obtain amplitude information, then obtain a square wave signal by using a comparator, and then send the square wave signal to a timer to obtain frequency information.

In still some other embodiments, the detection circuit may perform signal processing on the obtained signal to obtain a digital signal, and then transmit the digital signal to the second controller 120A.

The foregoing process of sampling as well as calculation and analysis on the signal $V_{ir}$ may be based on a relatively mature technology in the signal processing field. Details are not described herein in this embodiment of this application.

The first controller 150A provided in this embodiment of this application may be integrated with the motor controller 150 in FIG. 1, for example, integrated on a same MCU, or may be separately disposed, for example, separately integrated on different MCUs. The second controller 120A may be integrated with the excitation controller 120 in FIG. 1, for example, integrated on a same MCU, or may be separately disposed, for example, separately integrated on different MCUs. This is not limited in this embodiment of this application.

In some other embodiments, alternatively, the first controller 150A and the second controller 120A may be integrated on a same MCU.

In the foregoing description, the detection circuit 170 includes the current transformer CT as an example. The detection circuit 170 may be implemented in another manner. For example, a primary side voltage of the ideal transformer Tr may be detected. A general purpose is to detect the amplitude and the frequency of the response signal corresponding to the pulse current excitation to obtain the electrical parameter of the wireless excitation system.

In conclusion, an accurate leakage inductor $L_{lk1}$ of the primary side and an accurate excitation inductor $L_m$ can be obtained by detecting the parameter of the excitation transformer when the secondary side is short-circuited and the secondary side is open-circuited. If an absolute value of a difference between a current detected value of each of $L_{lk1}$ and $L_m$ and a preset electrical parameter is less than or equal to a preset threshold, it indicates that the wireless excitation system is normal in this case; otherwise, it is determined that a fault occurs. The preset threshold may be determined based on an actual situation. This is not limited in this embodiment of this application. In the wireless excitation system provided in this embodiment of this application, detection may be completed on the stator side of the motor without adding a complex hardware circuit on the rotor side of the motor, thereby reducing costs and improving reliability.

In some embodiments, the preset electrical parameter and the preset threshold may be predetermined and stored in a storage unit, and are called before used.

Embodiment 3

The foregoing embodiment describes a principle in which the second controller determines, by using the electrical parameter, whether the wireless excitation system is faulty. The following describes a principle in which the second controller performs fault detection by using the received response signal.

Figure 5:
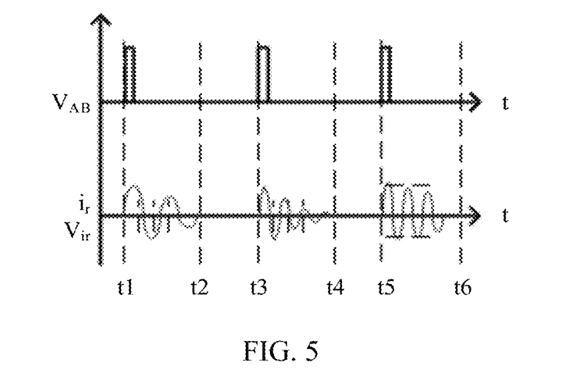
FIG. 5 is a schematic diagram of a pulse current excitation and a response signal according to an embodiment of this application.

FIG. 5 is a schematic diagram of a pulse current excitation and a response signal according to an embodiment of this application.

Referring to FIG. 3 together, after the pulse current excitation is injected into the primary side circuit of the excitation transformer by using the second controller 120A, a waveform of the voltage $V_{AB}$ corresponding to the pulse current excitation is shown in FIG. 5.

The second controller 120A obtains a waveform characteristic of the signal $V_{ir}$, including a frequency and an amplitude. The frequency and the amplitude of the signal $V_{ir}$ represent the frequency and the amplitude of the current response $i_r$ of the primary side of the excitation transformer, and $V_{ir}$ can be used in place of $i_r$ for fault detection.

The second controller 120A determines that the rectifier bridge diode of the rotor has an open circuit fault when the frequency of $V_{ir}$ is lower than a preset frequency range; determines that the rectifier bridge diode of the rotor has a short circuit fault when the frequency of $V_{ir}$ is higher than the preset frequency range; and determines that a capacitance of an output capacitor of the rectifier bridge is abnormal when the amplitude of $V_{ir}$ is higher than a preset amplitude range.

The preset frequency range and the preset amplitude range may be predetermined and stored in a storage unit, and are called before used.

Embodiment 4

Based on the wireless excitation system provided in the foregoing embodiment, this embodiment of this application further provides a detection method applied to the wireless excitation system. The following describes the method with reference to an accompanying drawing.

Figure 6:
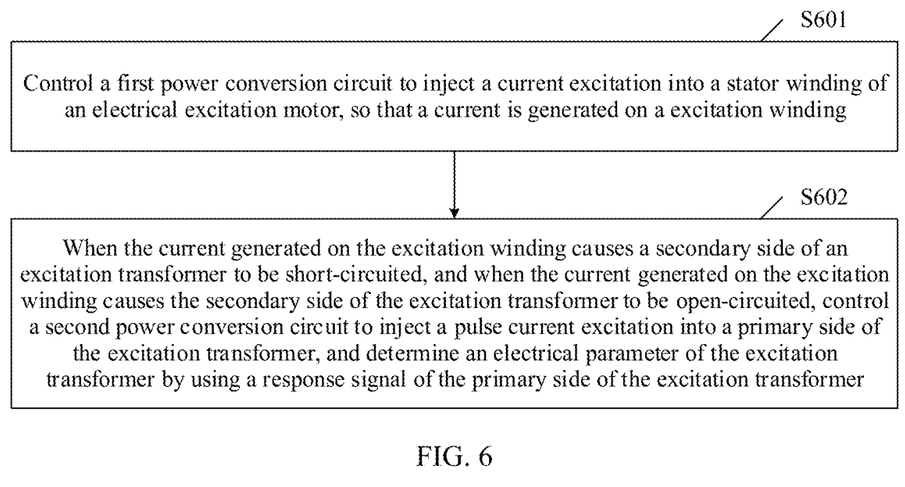
FIG. 6 is a flowchart of a detection method for a wireless excitation system according to an embodiment of this application.

FIG. 6 is a flowchart of a detection method for a wireless excitation system according to an embodiment of this application.

The method provided in this embodiment of this application includes the following operations.

S601. Control the first power conversion circuit to inject a current excitation into the stator winding of the electrical excitation motor, so that a current is generated on the excitation winding.

When a current excitation is injected into the stator winding of the motor, a current is generated on the excitation winding of the motor, and a direction of the current generated on the excitation winding may be changed by changing a waveform characteristic of the excitation current. A load characteristic of the diode used in the rectifier bridge is related to the current direction, so that a load characteristic of the secondary side of the excitation transformer may be changed by changing the injected current excitation.

S602. When the current generated on the excitation winding causes the secondary side of the excitation transformer to be short-circuited, and when the current generated on the excitation winding causes the secondary side of the excitation transformer to be open-circuited, control the second power conversion circuit to inject a pulse current excitation into the primary side of the excitation transformer, and determine an electrical parameter of the excitation transformer by using a response signal of the primary side of the excitation transformer.

For different load characteristics of the secondary side of the excitation transformer, different response signals are generated under the pulse current excitation. Therefore, the electrical parameter of the excitation transformer may be determined based on the received response signal, to determine a fault.

Still referring to FIG. 3, the following provides a description with reference to a specific implementation of the wireless excitation system.

Figure 7:
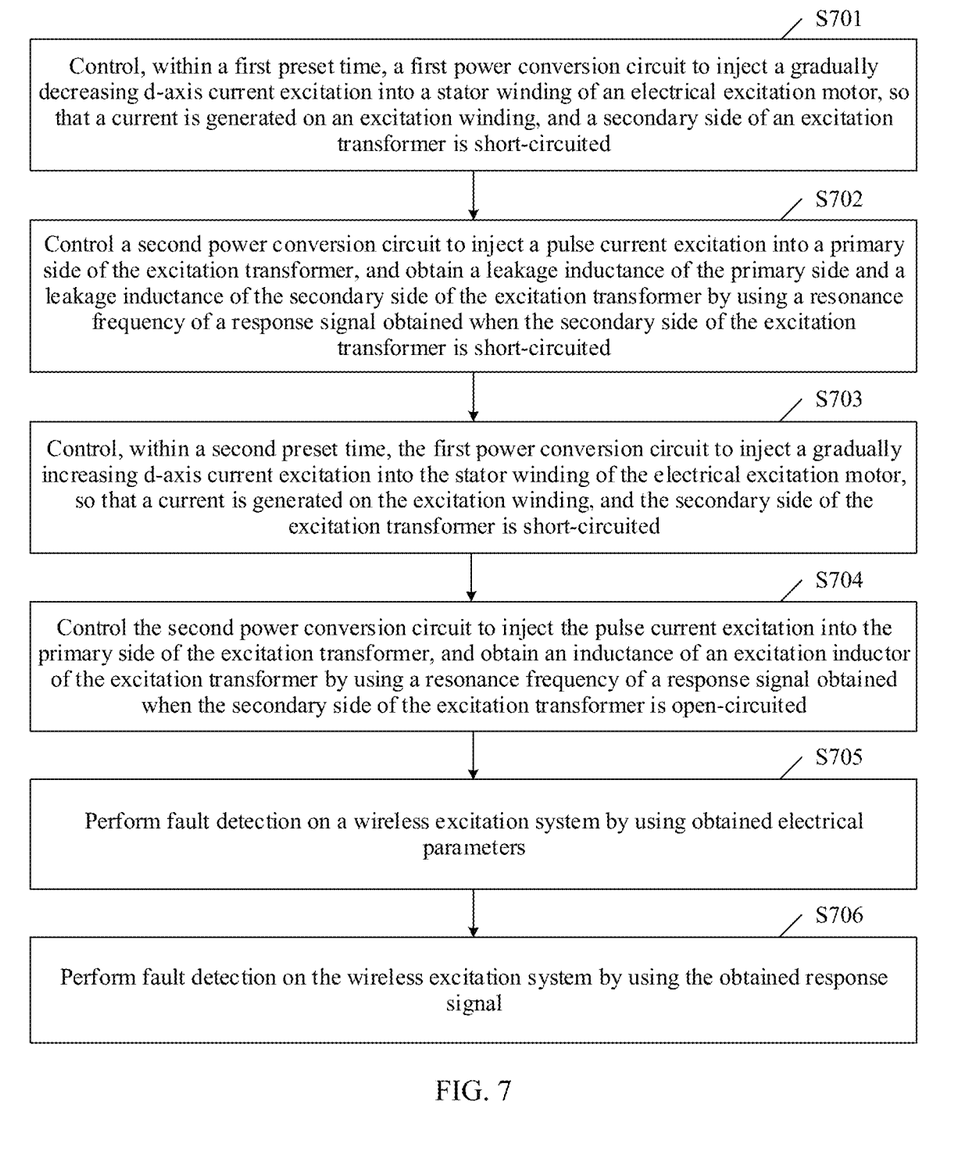
FIG. 7 is a flowchart of another detection method for a wireless excitation system according to an embodiment of this application.

FIG. 7 is a flowchart of another detection method for a wireless excitation system according to an embodiment of this application.

The following operations are included.

S701. Control, within a first preset time, the first power conversion circuit to inject a gradually decreasing d-axis current excitation into the stator winding of the electrical excitation motor, so that a current is generated on the excitation winding, and the secondary side of the excitation transformer is short-circuited.

S702. Control the second power conversion circuit to inject a pulse current excitation into the primary side of the excitation transformer, and obtain a leakage inductance of the primary side and a leakage inductance of the secondary side of the excitation transformer by using a resonance frequency of a response signal obtained when the secondary side of the excitation transformer is short-circuited.

The first preset time is greater than a duration of the pulse current excitation.

S703. Control, within a second preset time, the first power conversion circuit to inject a gradually increasing d-axis current excitation into the stator winding of the electrical excitation motor, so that a current is generated on the excitation winding, and the secondary side of the excitation transformer is short-circuited.

S704. Control the second power conversion circuit to inject a pulse current excitation into the primary side of the excitation transformer, and obtain an inductance of an excitation inductor of the excitation transformer by using a resonance frequency of a response signal obtained when the secondary side of the excitation transformer is open-circuited.

The second preset time is greater than a duration of the pulse current excitation.

S705. Perform fault detection on the wireless excitation system by using the obtained electrical parameters.

When an absolute value of a difference between any one of the leakage inductance of the primary side, the leakage inductance of the secondary side, and the inductance of the excitation inductor of the excitation transformer and a preset electrical parameter is greater than a preset threshold, it is determined that the wireless excitation system is faulty.

S706. Perform fault detection on the wireless excitation system by using the obtained response signal.

It is determined that the rectifier bridge diode of the rotor has an open circuit fault when a frequency of the response signal is lower than a preset frequency range.

It is determined that the rectifier bridge diode of the rotor has a short circuit fault when the frequency of the response signal is higher than the preset frequency range.

It is determined that a capacitance of an output capacitor of the rectifier bridge is abnormal when an amplitude of the response signal is higher than a preset amplitude range.

The foregoing operations provided in this embodiment of this application are merely for ease of description, but do not constitute a limitation on this application. Persons skilled in the art may adjust or modify the foregoing operations based on an actual situation, for example, a sequence of S705 and S706 may be switched.

In conclusion, according to the method provided in this embodiment of this application, different current excitations are injected into the stator winding of the motor, so that currents in different directions are generated on the excitation winding, thereby changing a load characteristic of the secondary side of the excitation transformer. When the current generated on the excitation winding causes the secondary side of the excitation transformer to be short-circuited, and when the current generated on the excitation winding causes the secondary side of the excitation transformer to be open-circuited, a pulse current excitation is injected into the primary side of the excitation transformer. The pulse current excitation causes the primary side of the excitation transformer to generate a response signal corresponding to the pulse current excitation. Due to different load characteristics of the secondary side of the excitation transformer, detected response signals are different. Then, the electrical parameters of the excitation transformer are determined based on the detected response signals, and fault analysis may be further performed.

Compared with a solution in which an auxiliary power supply, a detection circuit, and a communication circuit are disposed on the motor rotor side to detect an electrical parameter, the method provided in this embodiment of this application requires lower hardware costs, and detection may be completed on the stator side of the motor. Therefore, the method has higher reliability.

Embodiment 5

Based on the wireless excitation system provided in the foregoing embodiment, this embodiment of this application further provides an electric vehicle applied to the wireless excitation system. The following describes the electric vehicle with reference to an accompanying drawing.

Figure 8:
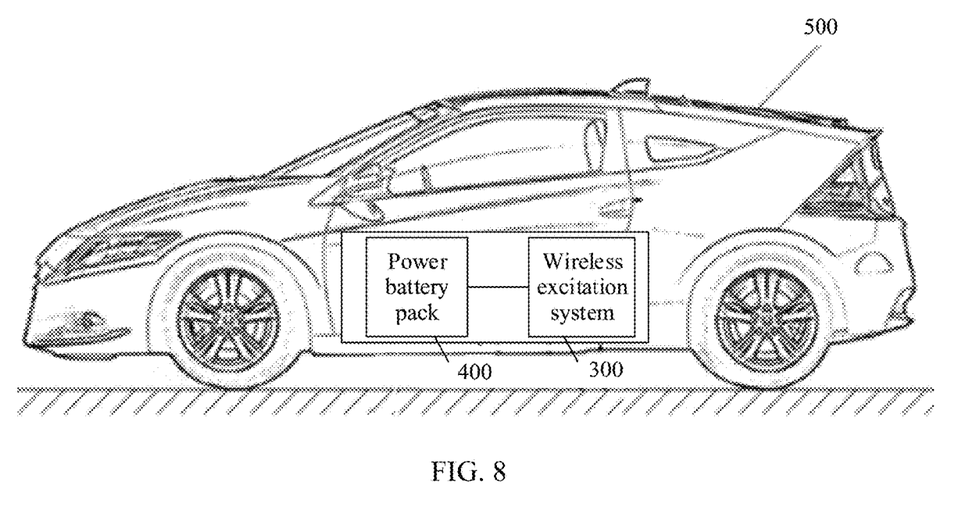
FIG. 8 is a schematic diagram of an electric vehicle according to an embodiment of this application.

FIG. 7 is a schematic diagram of an electric vehicle according to an embodiment of this application.

The electric vehicle 500 includes the wireless excitation system 300 provided in the foregoing embodiment and a power battery pack 400.

The power battery pack 400 is configured to supply power to the wireless excitation system 300, that is, equivalent to the direct current power supply 110 in FIG. 1 to FIG. 3.

The wireless excitation system 300 includes an excitation transformer, a motor, a detection circuit, a second power conversion circuit, a first power conversion circuit, a first controller, and a second controller. For a specific implementation and an operating principle of the wireless excitation system 300, refer to related descriptions in the foregoing embodiments. Details are not described herein again in this embodiment of this application.

In conclusion, the electric vehicle provided in an embodiment of this application includes the wireless excitation system, and the first controller of the wireless excitation system controls the first power conversion circuit to inject a current excitation into the stator winding of the motor, so that a current is generated on the excitation winding, thereby changing a load characteristic of the secondary side of the excitation transformer. When the current generated on the excitation winding causes the secondary side of the excitation transformer to be short-circuited, and when the current generated on the excitation winding causes the secondary side of the excitation transformer to be open-circuited, the second controller controls the second power conversion circuit to inject a pulse current excitation into the primary side of the excitation transformer. The pulse current excitation causes the primary side of the excitation transformer to generate a response signal corresponding to the pulse current excitation. The detection circuit obtains the response signal of the primary side of the excitation transformer, and then transmits the response signal to the second controller. For different load characteristics of the secondary side of the excitation transformer, different response signals are obtained. Therefore, the second controller may determine an electrical parameter of the excitation transformer based on the received response signal, to determine a fault. In the wireless excitation system, detection may be completed on the stator side of the motor without adding a complex hardware circuit on the rotor side of the motor, thereby reducing costs and improving reliability.

In some embodiments, the second controller may determine that a diode of a rectifier bridge has an open circuit fault when a frequency of the response signal is lower than a normal frequency range; may determine that an output of the rectifier bridge is short-circuited when the frequency of the response signal is higher than the normal frequency range; and may determine that an output capacitance of the rectifier bridge decreases abnormally when an amplitude of the response signal is higher than a normal range.

The second controller and the first controller in the foregoing embodiments of this application may be an application-specific integrated circuit (ASIC), a programmable logic device (PLD), a digital signal processor (DSP), or a combination thereof. The PLD may be a complex programmable logic device (CPLD), a field-programmable gate array (FPGA), a generic array logic (GAL), or any combination thereof. This is not limited in this embodiment of this application.

It may be understood that the technical solutions provided in this application may be further applied to a wireless excitation generator, and a similar detection circuit and control method are used to detect an electrical parameter and determine a fault.

It should be understood that in this application, "at least one (item)" refers to one or more, and "a/the plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Embodiments in this specification are all described in a progressive manner, for same or similar parts in embodiments, reference may be made to these embodiments, and each embodiment focuses on a difference from other embodiments. The apparatus embodiment described above is merely an example, and the units and modules described as separate parts may or may not be physically separate. In addition, some or all of the units and modules may be selected depending on actual requirements, to achieve objectives of the solutions of the embodiments. Persons of ordinary skill in the art may understand and implement embodiments without creative efforts.

The foregoing descriptions are merely specific implementations of this application. It should be noted that persons of ordinary skill in the art may make several improvements or polishing without departing from the principle of this application and the improvements or polishing shall fall within the protection scope of this application.

What is claimed is:

1. A wireless excitation system, comprising:
a first power conversion circuit having an input end connected to a power supply and an output end connected to a stator winding of an electrical excitation motor;
a second power conversion circuit having an input end connected to the power supply;
an excitation transformer having a primary side connected to an output end of the second power conversion circuit, wherein the excitation transformer is configured to transmit energy required by an excitation winding of the electrical excitation motor from a stator to a rotor;
an excitation rectifier circuit configured to convert an alternating current (AC) received by a secondary side of the excitation transformer into a direct current (DC) and then transmit the direct current to the excitation winding;
a first controller configured to control the first power conversion circuit to inject a current excitation into the stator winding, so that a current is generated on the excitation winding; and
a detection circuit configured to obtain a response signal of the primary side of the excitation transformer and send the response signal to a second controller,
wherein the second controller is configured to control the second power conversion circuit to inject a pulse current excitation into the primary side of the excitation transformer, and determine an electrical parameter of the excitation transformer based on the response signal, in response to determining the current generated on the excitation winding causes the secondary side of the excitation transformer to be short-circuited, and the current generated on the excitation winding causes the secondary side of the excitation transformer to be open-circuited.

2. The system according to claim 1, wherein the second controller is further configured to:
obtain a leakage inductance of the primary side of the excitation transformer and a leakage inductance of the secondary side of the excitation transformer by using a resonance frequency of a response signal obtained when the secondary side of the excitation transformer is short-circuited; and
obtain an inductance of an excitation inductor of the excitation transformer by using a resonance frequency of a response signal obtained when the secondary side of the excitation transformer is open-circuited.

3. The system according to claim 1, wherein the second controller is further configured to determine that the wireless excitation system is faulty, in response to determining an absolute value of a difference between the electrical parameter and a preset electrical parameter is greater than a preset threshold.

4. The system according to claim 1, wherein the second controller is further configured to perform fault detection on the wireless excitation system based on the response signal.

5. The system according to claim 4, wherein the second controller is further configured to:
determine that a diode of the excitation rectifier circuit has an open circuit fault when a frequency of the response signal is lower than a preset frequency range;
determine that the diode of the excitation rectifier circuit has a short circuit fault when the frequency of the response signal is higher than the preset frequency range; and
determine that a capacitance of an output capacitor of the excitation rectifier circuit is abnormal when an amplitude of the response signal is higher than a preset amplitude range.

6. The system according to claim 1, wherein the first controller is further configured to:
control, within a first preset time, the first power conversion circuit to inject a gradually decreasing d-axis current excitation into the stator winding of the electrical excitation motor, so that the secondary side of the excitation transformer is short-circuited, wherein the d-axis is consistent with a magnetic field direction of the rotor; and
control, within a second preset time, the first power conversion circuit to inject a gradually increasing d-axis current excitation into the stator winding of the electrical excitation motor, so that the secondary side of the excitation transformer is short-circuited, wherein the first preset time and the second preset time are greater than a duration of the pulse current excitation.

7. The system according to claim 1, wherein the first controller is further configured to:
send a control instruction to the second controller after injecting the current excitation into the stator winding of the electrical excitation motor to instruct the second controller to control the second power conversion circuit to inject the pulse current excitation into the primary side of the excitation transformer.

8. The system according to claim 1, wherein the detection circuit comprises:
a current transformer having a primary side winding connected to the primary side of the excitation transformer; and
a signal processing circuit connected to a secondary side winding of the current transformer, wherein the signal processing circuit is configured to process a signal collected by the current transformer to obtain the response signal, and send the response signal to the second controller.

9. The system according to claim 1, wherein the first controller and the second controller are integrated into one micro control unit (MCU).

10. A detection method, comprising:
providing a wireless excitation system, wherein the wireless excitation system comprises an excitation transformer, an excitation rectifier circuit, an electrical excitation motor, a first power conversion circuit, and a second power conversion circuit; an input end of the first power conversion circuit is connected to a power supply, and an output end of the first power conversion circuit is connected to a stator winding of the electrical excitation motor; an input end of the second power conversion circuit is connected to the power supply, and an output end of the second power conversion circuit is connected to a primary side of the excitation transformer; the excitation transformer is configured to transmit energy required by an excitation winding of the electrical excitation motor from a stator to a rotor; the excitation rectifier circuit is configured to convert an alternating current received by a secondary side of the excitation transformer into a direct current and then transmit the direct current to the excitation winding;
controlling the first power conversion circuit to inject a current excitation into the stator winding of the electrical excitation motor, so that a current is generated on the excitation winding; and
controlling the second power conversion circuit to inject a pulse current excitation into the primary side of the excitation transformer, and determining an electrical parameter of the excitation transformer by using a response signal of the primary side of the excitation transformer, in response to determining the current generated on the excitation winding causes the secondary side of the excitation transformer to be short-circuited, and the current generated on the excitation winding causes the secondary side of the excitation transformer to be open-circuited.

11. The method according to claim 10, wherein the determining an electrical parameter of the excitation transformer by using a response signal of the primary side of the excitation transformer comprises:
obtaining a leakage inductance of the primary side of the excitation transformer and a leakage inductance of the secondary side of the excitation transformer by using a resonance frequency of a response signal obtained when the secondary side of the excitation transformer is short-circuited; and
obtaining an inductance of an excitation inductor of the excitation transformer by using a resonance frequency of a response signal obtained when the secondary side of the excitation transformer is open-circuited.

12. The method according to claim 10, further comprising:
determining that the wireless excitation system is faulty, in response to determining an absolute value of a difference between the electrical parameter and a preset electrical parameter is greater than a preset threshold.

13. The method according to claim 10, further comprising:
performing fault detection on the wireless excitation system by using the response signal.

14. The method according to claim 13, wherein the performing fault detection on the wireless excitation system based on the response signal comprises:
determining that a diode of the excitation rectifier circuit has an open circuit fault when a frequency of the response signal is lower than a preset frequency range;
determining that the diode of the excitation rectifier circuit has a short circuit fault when the frequency of the response signal is higher than the preset frequency range; and
determining that a capacitance of an output capacitor of the excitation rectifier circuit is abnormal when an amplitude of the response signal is higher than a preset amplitude range.

15. The method according to claim 10, wherein the controlling the first power conversion circuit to inject a current excitation into the stator winding of the motor comprises:
controlling, within a first preset time, the first power conversion circuit to inject a gradually decreasing d-axis current excitation into the stator winding of the electrical excitation motor, so that a current is generated on the excitation winding, and the secondary side of the excitation transformer is short-circuited, wherein the d-axis is consistent with a magnetic field direction of the rotor; and
controlling, within a second preset time, the first power conversion circuit to inject a gradually increasing d-axis current excitation into the stator winding of the electrical excitation motor, so that a current is generated on the excitation winding, and the secondary side of the excitation transformer is short-circuited, wherein the first preset time and the second preset time are greater than a duration of the pulse current excitation.

16. An electric vehicle, comprising:
a wireless excitation system, comprising:
a first power conversion circuit having an input end connected to a power supply and an output end connected to a stator winding of an electrical excitation motor;
a second power conversion circuit having an input end connected to the power supply;
an excitation transformer having a primary side connected to an output end of the second power conversion circuit, wherein the excitation transformer is configured to transmit energy required by an excitation winding of the electrical excitation motor from a stator to a rotor;

an excitation rectifier circuit configured to convert an alternating current (AC) received by a secondary side of the excitation transformer into a direct current (DC) and then transmit the direct current to the excitation winding;

a first controller configured to control the first power conversion circuit to inject a current excitation into the stator winding, so that a current is generated on the excitation winding; and a detection circuit configured to obtain a response signal of the primary side of the excitation transformer and send the response signal to a second controller, wherein the second controller is configured to control the second power conversion circuit to inject a pulse current excitation into the primary side of the excitation transformer, and determine an electrical parameter of the excitation transformer based on the response signal, in response to determining the current generated on the excitation winding causes the secondary side of the excitation transformer to be short-circuited, and the current generated on the excitation winding causes the secondary side of the excitation transformer to be open-circuited; and a power battery pack configured to supply power to the wireless excitation system.

17. The electric vehicle according to claim 16, wherein the second controller is further configured to:

obtain a leakage inductance of the primary side of the excitation transformer and a leakage inductance of the secondary side of the excitation transformer by using a resonance frequency of a response signal obtained when the secondary side of the excitation transformer is short-circuited; and obtain an inductance of an excitation inductor of the excitation transformer by using a resonance frequency of a response signal obtained when the secondary side of the excitation transformer is open-circuited.

18. The electric vehicle according to claim 16, wherein the second controller is further configured to determine that the wireless excitation system is faulty, in response to determining an absolute value of a difference between the electrical parameter and a preset electrical parameter is greater than a preset threshold.

19. The electric vehicle according to claim 16, wherein the second controller is further configured to perform fault detection on the wireless excitation system based on the response signal.

20. The electric vehicle according to claim 19, wherein the second controller is further configured to:

determine that a diode of the excitation rectifier circuit has an open circuit fault when a frequency of the response signal is lower than a preset frequency range;

determine that the diode of the excitation rectifier circuit has a short circuit fault when the frequency of the response signal is higher than the preset frequency range; and determine that a capacitance of an output capacitor of the excitation rectifier circuit is abnormal when an amplitude of the response signal is higher than a preset amplitude range.

* * * * *